United States Patent
Snedeker

(10) Patent No.: US 7,878,588 B2
(45) Date of Patent: Feb. 1, 2011

(54) ONE-PIECE ADJUSTABLE SEAT COVER

(75) Inventor: Kristen Snedeker, Leawood, KS (US)

(73) Assignee: Summer Infant (USA), Inc., Woonsocket, RI (US)

( * ) Notice: Subject to any disclaimer, the term of this patent is extended or adjusted under 35 U.S.C. 154(b) by 0 days.

(21) Appl. No.: 11/745,818

(22) Filed: May 8, 2007

(65) Prior Publication Data
US 2007/0262624 A1 Nov. 15, 2007

Related U.S. Application Data

(60) Provisional application No. 60/746,727, filed on May 8, 2006.

(51) Int. Cl.
*A47C 27/00* (2006.01)
(52) U.S. Cl. .................. 297/229; 297/218.1; 297/219.1
(58) Field of Classification Search .............. 297/219.1, 297/188.01, 188.2, 218.1–218.5, 224–229
See application file for complete search history.

(56) References Cited

U.S. PATENT DOCUMENTS

| | | | | |
|---|---|---|---|---|
| 1,954,376 | A * | 4/1934 | Brueckl | 297/253 |
| 5,005,901 | A * | 4/1991 | Hinde | 297/229 |
| 5,275,463 | A * | 1/1994 | Rocha | 297/229 |
| 5,294,166 | A * | 3/1994 | Shapland | 296/97.23 |
| 5,626,397 | A * | 5/1997 | Reid | 297/467 |
| 5,641,199 | A * | 6/1997 | Bond-Madsen | 297/229 |
| 5,690,380 | A * | 11/1997 | Waters | 297/225 |
| 5,954,404 | A * | 9/1999 | Suzuki | 297/219.12 |
| 6,050,639 | A * | 4/2000 | Horn | 297/229 |
| 6,481,793 | B1 * | 11/2002 | Horn | 297/228.1 |
| 6,786,546 | B2 * | 9/2004 | McConnell et al. | 297/219.12 |
| 6,817,664 | B1 * | 11/2004 | Tang et al. | 297/229 |
| 7,000,984 | B1 * | 2/2006 | Ward | 297/228.12 |
| 7,172,246 | B1 * | 2/2007 | Itakura | 297/219.1 |
| 7,258,399 | B2 * | 8/2007 | Neustat | 297/219.1 |
| 7,374,240 | B2 * | 5/2008 | Gold et al. | 297/219.12 |
| 2008/0093900 | A1 * | 4/2008 | Gold et al. | 297/219.12 |

OTHER PUBLICATIONS

Print out from www.skjp.com of the Super Mat. Dated Mar. 9, 2006.
Print out from www.skjp.com of the Ultra Mat. Dated Mar. 9, 2006.
Print out from www.munchkininc.com of an auto seat protector. Dated Mar. 9, 2006.
Print out from www.jlchildress.com of an auto seat mat. Dated Mar. 9, 2006.
Print out from www.skjp.com of the Grip-It. Dated Mar. 9, 2006.
Print out from www.onestepahead.com of a car seat protector. Dated Mar. 9, 2006.

(Continued)

*Primary Examiner*—David Dunn
*Assistant Examiner*—Erika Garrett
(74) *Attorney, Agent, or Firm*—Sunstein Kann Murphy & Timbers LLP

(57) ABSTRACT

The present invention relates to a unitary seat cover for accommodating a child safety seat upon a vehicle seat having an adjustable upper protective panel and a lower protective panel which are integrally attached by a fold line forming a unitary elongated cover.

15 Claims, 10 Drawing Sheets

OTHER PUBLICATIONS

Print out from www.princelionheart.com of the Seatsaver. Dated Mar. 9, 2006.
Print out from www.princelionheart.com of the Two-Stage Seatsaver. Dated Mar. 9, 2006.
Print out from www.princelionheart.com of The Original Seatsaver. Dated Mar. 9, 2006.

* cited by examiner

ONE-PIECE ADJUSTABLE SEAT COVER

FIELD OF INVENTION

The present invention relates to a protective seat cover, and more particularly to an improved, one piece seat cover which is adjustable to accommodate both a rear-facing and a forward-facing child safety seat. The seat cover prevents a vehicle seat from being permanently compressed, scratched, or soiled by a child safety seat and provides a non-skid surface to prevent the child safety seat from sliding.

BACKGROUND OF INVENTION

Each year thousands of young children are killed or injured in automobile accidents. As a result, child safety seats are now mandatory within the United States for young children. In addition to standard child safety seats, where the child rests in the child safety seat, various other restraint systems for infants and children exist. While the age range of children required to use child safety seats varies by state, as a general rule, a child should be restrained in a child safety seat until they reach about 4'9" in height and are between 8 and 12 years of age.

Child safety seats are typically positioned in one of two directions depending on the age and weight of the child sitting. As a general rule, the child safety seat is positioned facing the rear of the vehicle until the infant has reached at least 1 year of age and weighs at least 20 pounds. Once the child has reached 1 year of age and 20 pounds, the child safety seat is positioned facing the front of the vehicle.

The child safety seat is generally secured to the vehicle seat using existing adult safety restraints, such as lap and shoulder belts. It is essential to the performance of the safety seat that the adult restraints remain taut, securely holding the child safety seat in place. A significant problem exists, however, in that the combined weight of the child safety seat and child when continuously applied to the vehicle seat results in permanent damage thereto. Permanent compression damage, scratches, tears, and marring are the most common damages to vehicle seats caused by child safety seats. Further damage to the vehicle seat can occur when infants or children using the safety seat inadvertently soil the seats, for example, diaper leaks, vomiting, or accidental spilling of food or drinks.

In an attempt to resolve these problems, many parents resort to using seat coverings such as plastic sheets, blankets, and rubber mats between the vehicle seat and the child safety seat. These seat coverings generally achieve the primary objective of protecting vehicular seats, but possess certain deficiencies that detract from the overall utility.

Most significantly is the inability to protect the entirety of the vehicle seat. Specifically, plastic sheets, rubber mats, and blankets are essentially tailored to cover only the seat portion of the vehicle seat and provides some coverage when accommodating a rear-facing safety seat as it distributes weight on the seating portion of the vehicle seat. But, this arrangement offers no protection for the seat-back portion of the vehicle seat against the safety seat as it presses against the seat-back portion, which causes damage, or from objects projected onto it, such as food or drink. In addition, when the safety seat is repositioned to be forward facing, these coverings typically will not prevent the safety seat from contacting and damaging the exposed seat-back portion of the vehicle seat. Although multiple layers of plastic sheets, rubber mats, or padded blankets may theoretically be spread over the seats, such arrangement will be aesthetically unpleasing, not to mention awkward and difficult to maintain as they are not designed for such use.

There are also commercially available covers. One type is a full coverage mat that extends below the bottom and behind the back of the safety seat. Some are made with a single layer of non-slip material while others are made with dense padding with non-slip materials on the top and bottom of the mat. This design provides adequate vehicle seat protection when used with a child safety seat in the forward facing position, but it cannot be used with a child safety seat in the rear facing position because the upper portion of the back may fall on the child. While it may be possible to secure the upper portion of the mat to the vehicle headrest, this is not a viable option since it is recommended that infants be placed in the middle of the back seat, and most vehicles do not have a headrest in this location.

Another type of commercially available cover is an under seat design that only partially extends up the back of the vehicle seat. This type of cover provides adequate protection when the child safety seat is used in the rear facing position, as it has no upper portion to fall on the child. However, this type of cover offers no protection to the vehicle seat back when the child safety seat is used in the forward facing position or rear facing position.

Yet another type of commercially available is a multiple piece cover. The multiple piece cover utilizes a detachable upper portion so that the cover may be used for both rear and forward facing child safety seats. The upper portion is removed when used with a rear facing safety seat, and then re-attached for use with a forward facing safety seat. One problem with this design is that it offers no protection for the seat-back portion of the vehicle seat against the safety seat as it presses against the seat-back portion, which can cause damage, or against objects projected onto it, such as food or drink when the child safety seat is mounted in the rear-facing position. Another substantial problem with this design is that the consumer must keep track of the detached portion for about one year, until the child is old enough and weighs enough to use the safety seat in the forward facing position. This process is inconvenient and cumbersome, and the detached portion is often misplaced, lost, or forgotten during this time.

In view of the above-described shortcomings of vehicle seat coverings of the prior art, there exists a need in the art for a unitary vehicle seat cover that can be adjusted to optimally accommodate both rearward and forward facing child safety seats, the directions of which are critical at various stages of a child's growth. More specifically, there exists a need for a vehicle seat cover that provides a secure non-skid surface on which the child safety seat is positioned, as well as preventing the vehicle seat from becoming soiled, scratched, and permanently compressed irrespective of the direction the child safety seat is positioned.

SUMMARY OF THE INVENTION

The present invention specifically addresses and alleviates the above referenced deficiencies associated with the use of seat covers of the prior art. More particularly the present invention relates to a unitary seat cover for accommodating a child safety seat upon a vehicle seat having an adjustable upper protective panel and a lower protective panel which are integrally attached by a fold line forming a unitary elongated cover. When using the seat cover with a rear facing child safety seat, it is necessary to shorten the length of the adjustable upper protective panel to prevent the panel from falling into the infant. In one embodiment, the adjustable upper protective panel has a fold line allowing easy adjustment to shorten the length of the upper protective panel and accommodate a rear facing child safety seat or extend the length of the upper protective panel to accommodate a forward facing child safety seat and prevent the seat-back portion of the vehicle seat from becoming soiled, scratched, or permanently compressed. In another embodiment, the upper protective panel may include a multiplicity of fold lines. In another alternative, the adjustable upper protective panel includes an upper slideable portion that is in communication with the lower portion of the upper protective panel. In one embodiment, the upper slideable portion can be received by the lower portion that is configured in a pocket configuration allowing the upper slideable portion to move into and be enveloped by the lower pocket portion of the upper protective panel.

The lower protective panel prevents the seating portion of the vehicle seat from becoming soiled, scratched, or permanently compressed. The lower protective panel is a single piece in communication with the upper protective panel that may be rolled up to aid in the storage of the seat cover. Optionally, the lower protective panel may have a multiplicity of fold lines to aid in the storage of the seat cover. The length of the seat cover is adjustable to cover the area under the child safety seat or can extend to cover at least the entire vehicle seat extending above and below the child safety seat, wherein the width of the seat cover is about equal to or greater than the width of a child safety seat. In one embodiment, the width of the seat cover is wide enough to accommodate multiple child safety seats or other devices, for example, a cooler or storage unit. The fold lines are designed such that the elongated member only folds at the location of the fold lines and not elsewhere along the seat cover. Optionally, the seat cover includes a tongue attached to the seat cover which can be either integrally or removeably attached and which is received by a crease between the seat-back portion and the seating portion of a vehicle seat securing the cover in place.

DETAILED DESCRIPTION OF THE PREFERRED EMBODIMENT

Figure 1:
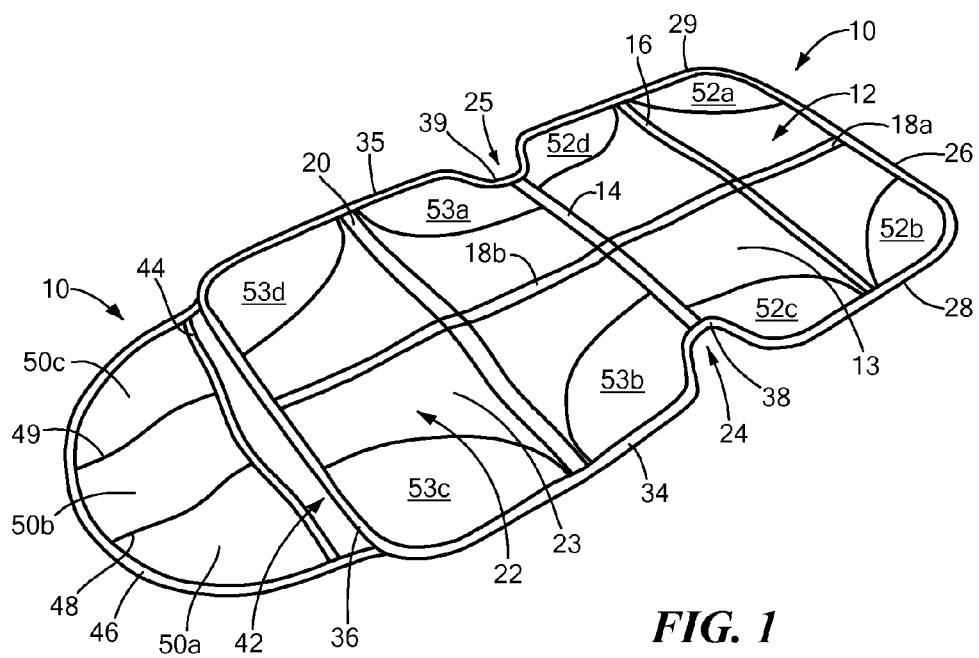
FIG. 1 is a perspective view of the face side of the seat cover lying flat.
Figure 3:
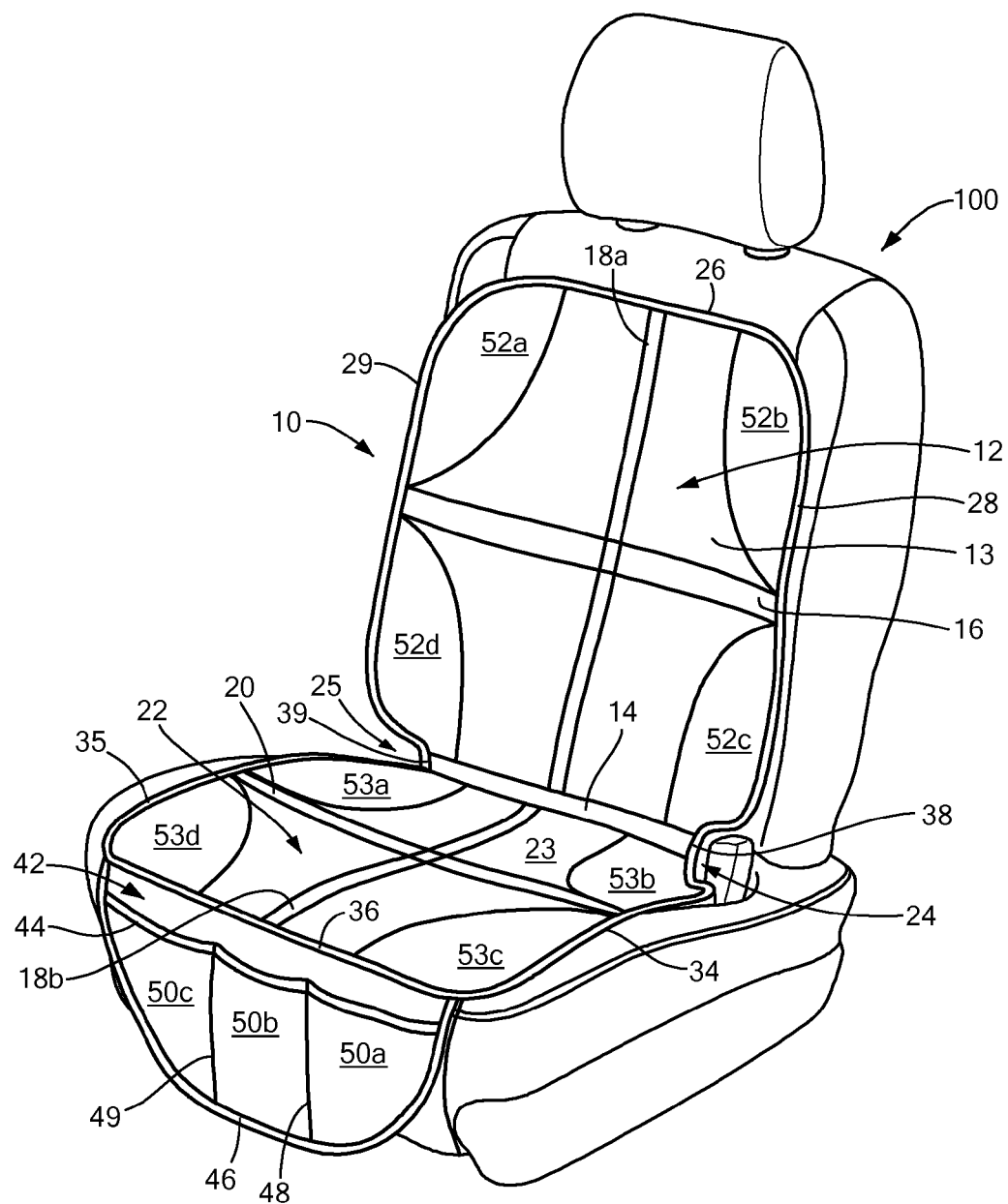
FIG. 3 is a perspective view of the seat cover of FIG. 1 illustrating its placement on a vehicle seat, wherein the adjustable upper protective panel includes a multiplicity of fold lines and is shown in the unfolded position to accommodate a forward-facing child safety seat thereupon.
Figure 4:
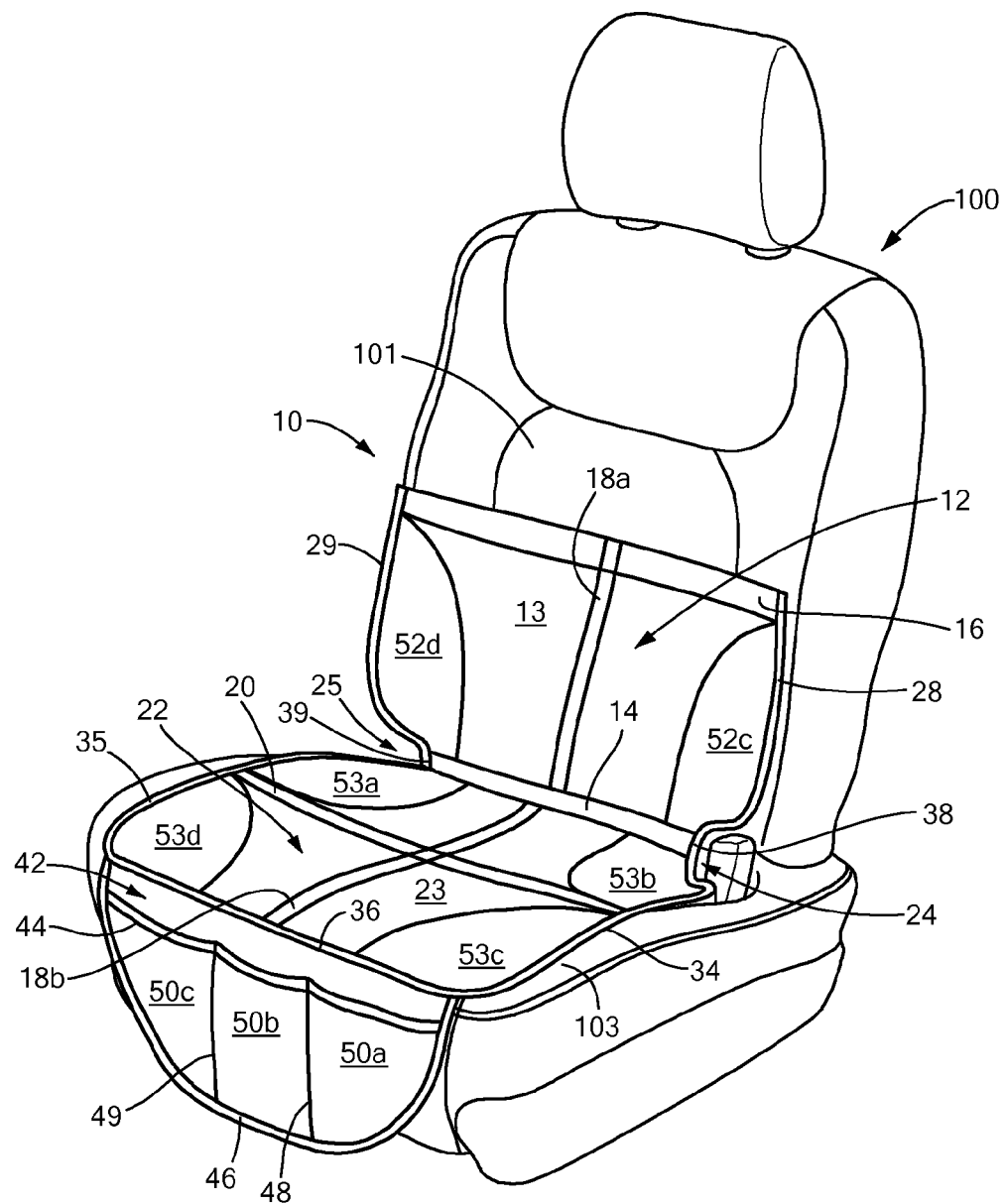
FIG. 4 is a perspective view of the seat cover of FIG. 1 illustrating its placement on a vehicle seat, wherein the adjustable upper protective panel includes a multiplicity of fold lines and is shown in a folded position to accommodate a rear-facing child safety seat thereupon.
Figure 5:
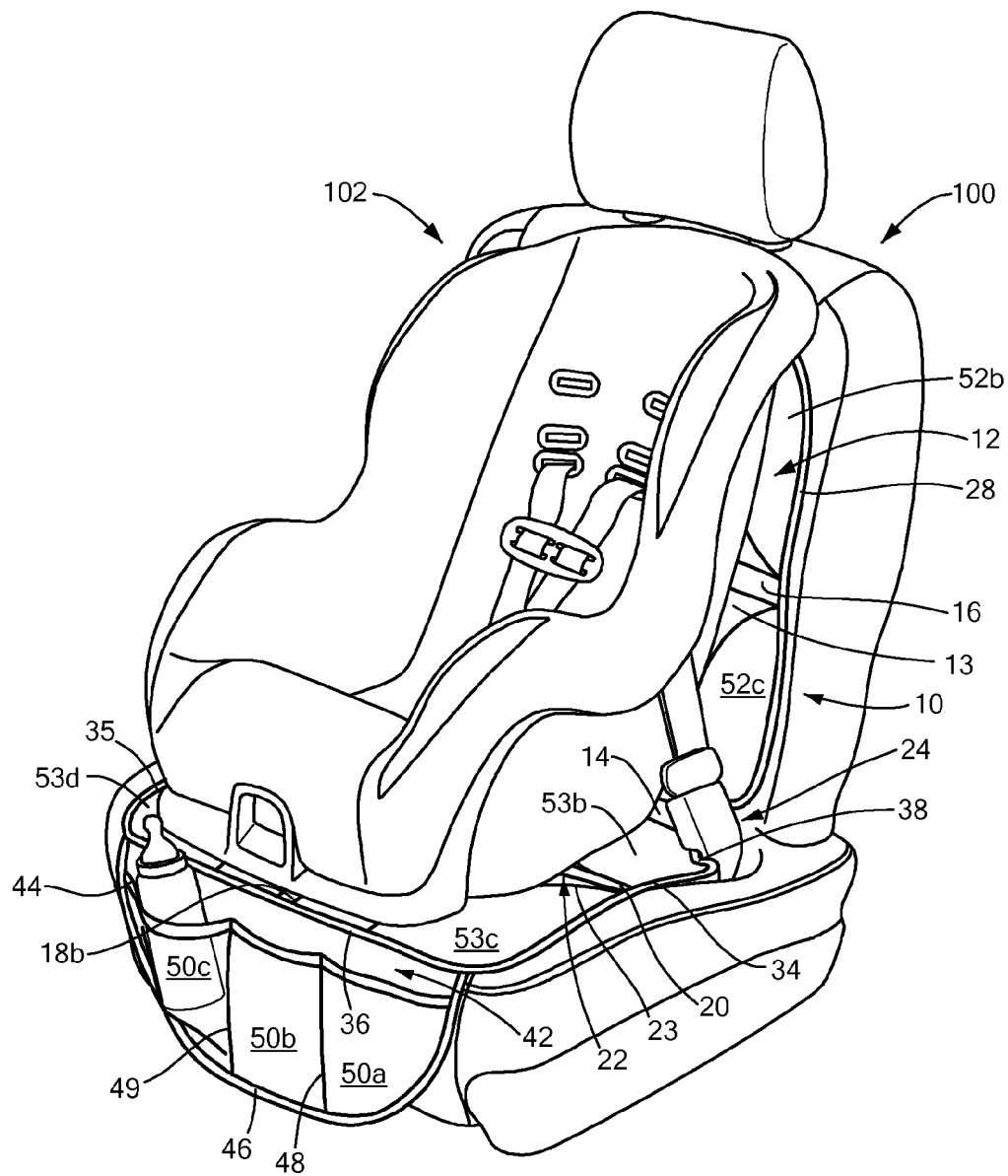
FIG. 5 is a perspective view of the seat cover of FIG. 1 illustrating its placement on a vehicle seat, wherein the adjustable upper protective panel includes a multiplicity of fold lines and is shown in an unfolded position receiving a forward-facing child safety seat.
Figure 6:
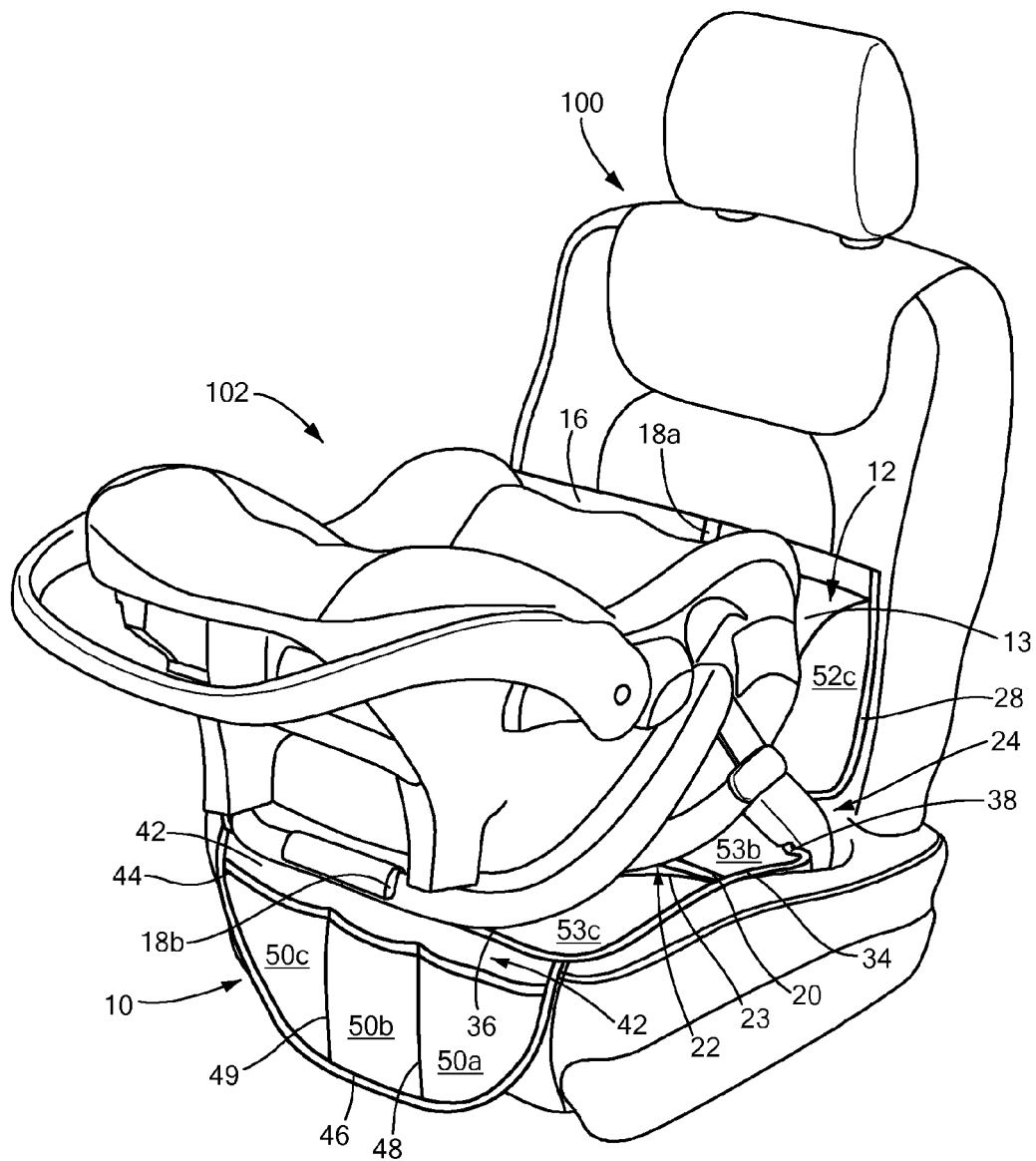
FIG. 6 is a perspective view of the seat cover of FIG. 1 illustrating its placement on a vehicle seat, wherein the adjustable upper protective panel includes a multiplicity of fold lines and is shown in a folded position receiving a rear-facing child safety seat.
Figure 8:
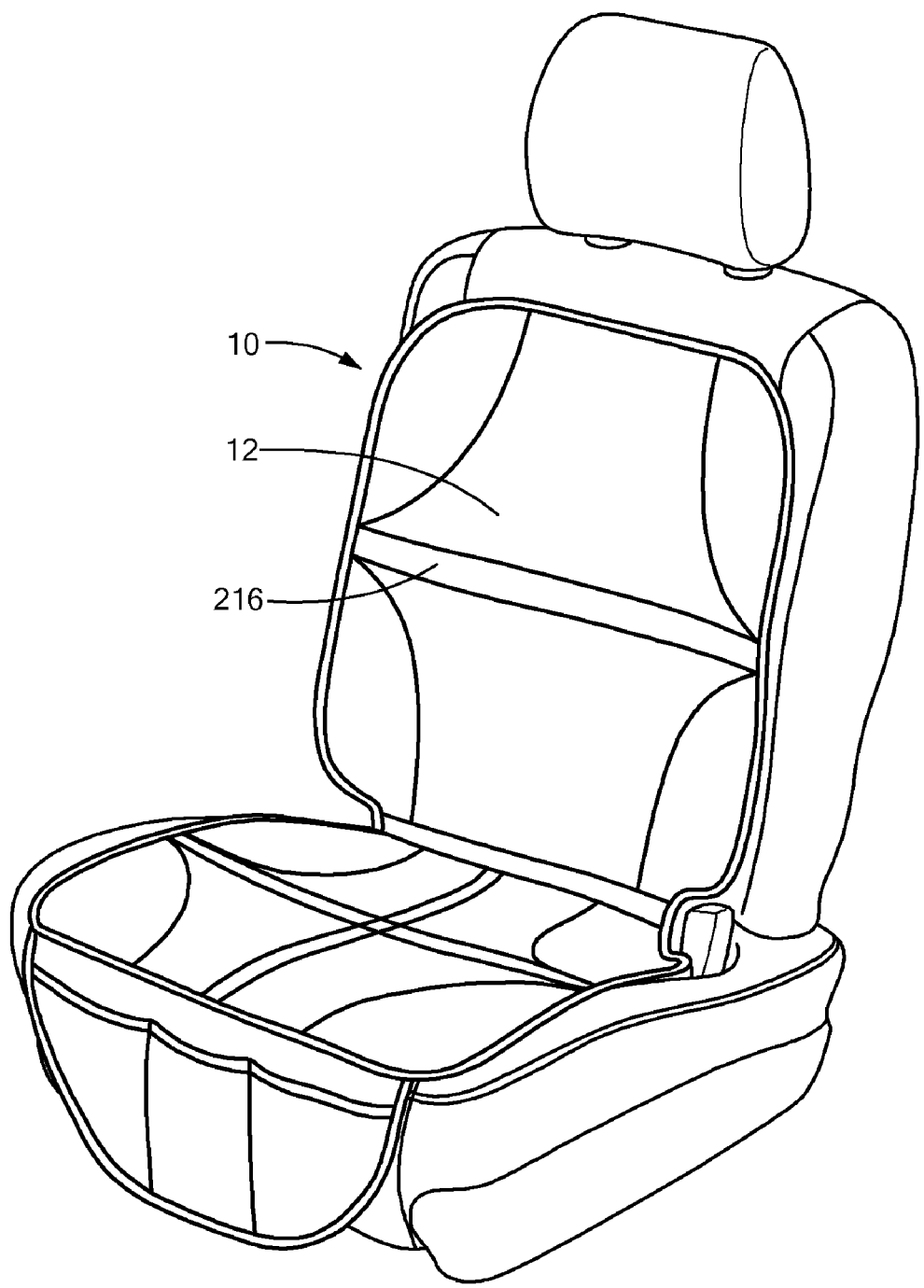
FIG. 8 is a perspective view of the seat cover used on a vehicle seat, wherein the adjustable upper protective panel includes a fold line.
Figure 9:
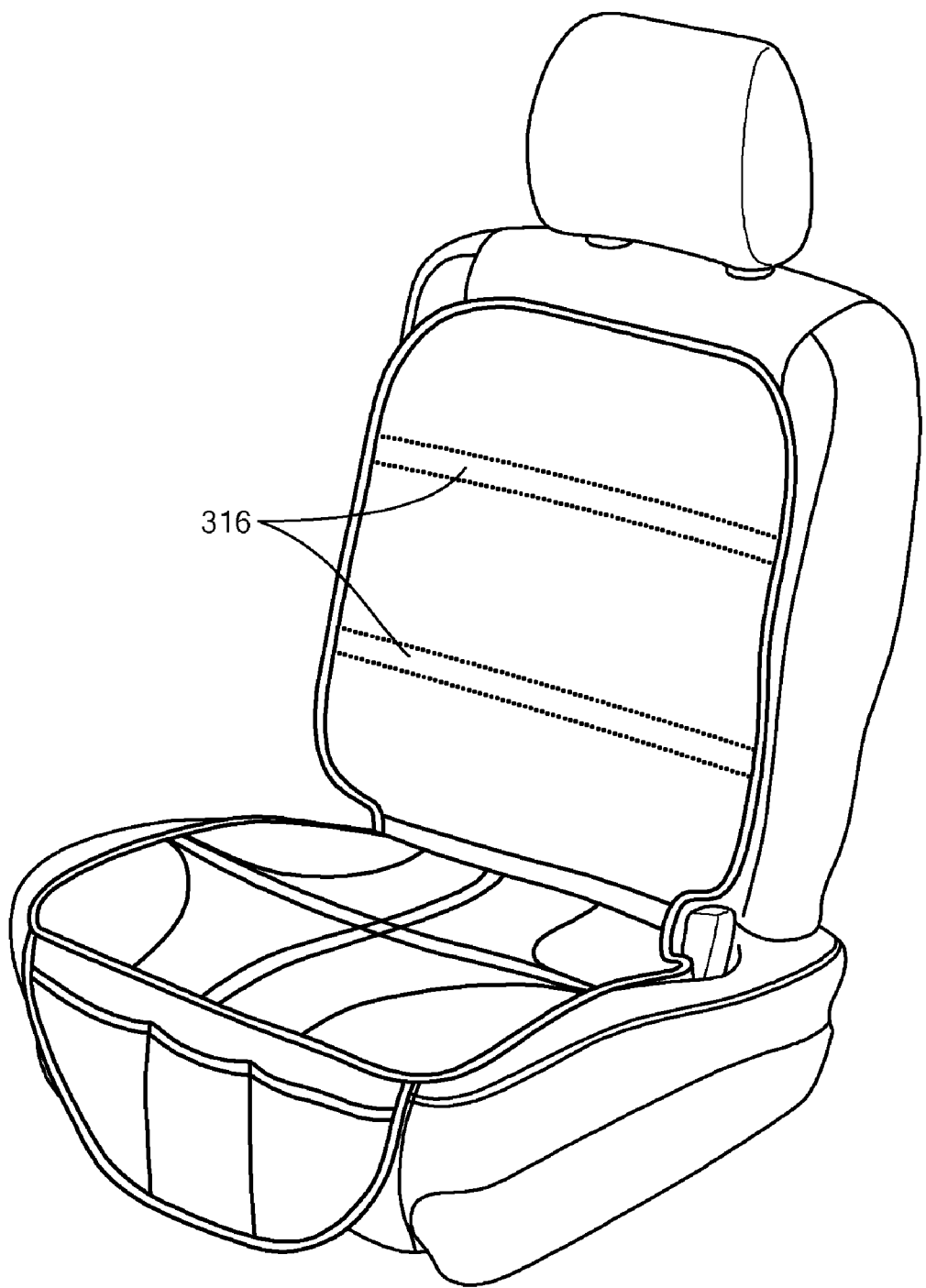
FIG. 9 is a perspective view of the seat cover used on a vehicle seat, wherein the adjustable upper protective panel includes a multiplicity of fold lines oriented parallel to each other.

The present invention relates to a unitary seat cover 10 used to protect vehicle seats 100 from damage caused when using a child safety seat 102. More specifically, the present invention is an unitary seat cover 10 having an adjustable upper protective panel 12 and a lower protective panel 22 integrally attached by a fold line 14. In one embodiment, the adjustable upper protective panel 12 is configured with a fold line 216 to allow the size of the upper protective panel to be adjusted. The fold line is demonstrated in FIG. 8. The fold line 216 is configured to adjust the size of the upper protective panel 12. The fold line 216 allows the upper protective panel 12 to be lengthened or shortened dependent on how much protection is required on the vehicle seat. In another embodiment, the fold line 216 may be positioned in any placement between the upper edge 26 and the fold line 14. In another embodiment, the upper protective panel 12 is configured with a multiplicity of fold lines (a multiplicity of fold lines is defined as one or more fold lines). The multiplicity of fold lines can be configured in a horizontal or vertical orientation or both in relationship to the top edge of the upper protective panel 12. The multiplicity of fold lines is configured to minimize or expand the size of the upper protective panel 12 and optionally for use in storage and packaging of the complete unitary seat cover 10. The adjustable upper protective panel 12 can be configured with a multiplicity of fold lines to allow the size of the upper protective panel to be adjusted. The fold line as demonstrated in 16 as shown in FIG. 1, allows easy adjustment to shorten the length of the upper protective panel 12 and accommodate a rear facing child safety seat, as shown in FIGS. 4 and 6, while still providing protection to the lower portion of the vehicle seat back, or extend the length of the upper protective panel 12 to accommodate a forward facing child safety seat, as shown in FIGS. 3 and 5, and prevent the seat-back portion of the vehicle seat 101 from becoming soiled, scratched, or permanently compressed. Further, the fold lines 16 and 18a are configured to aid in packaging and storage, by minimizing the size of the unitary seat cover. In another embodiment, the upper protective panel 12 is configured to include a multiplicity of fold lines 316 that are oriented parallel to each other and parallel to the upper edge of the upper protective panel and anywhere between the upper edge 26 and the fold line 14. The parallel fold lines 316 are demonstrated in FIG. 9.

The adjustable upper protective panel 12 has opposed faces 13 and 15 and is designed to contact the seat back portion 101 of a vehicle seat 100 and to accommodate the back or lower front portion of a child safety seat 102. In one embodiment, the adjustable upper protective panel 12 has at least one non-slip material member 52*a-d* on the front face 13 to prevent movement of the safety seat.

In another embodiment, the adjustable upper protective panel 12 includes an upper slideable portion that is in communication with the lower portion of the upper protective panel 12. The communication between the slideable portion and the lower portion of the upper protective panel 12 allows adjustment of the slideable portion to slide away from and toward the lower portion of the upper protective panel 12. In an alternative embodiment, the lower portion of the upper protective panel is configured as a pocket. The lower pocket portion allows the slideable portion to slide into the pocket portion, which adjusts the length of the upper protective panel 12.

Figure 10:
FIG. 10 is a perspective view of the seat cover used on a vehicle seat, wherein the lower protective panel does not include a fold line.
Figure 11:
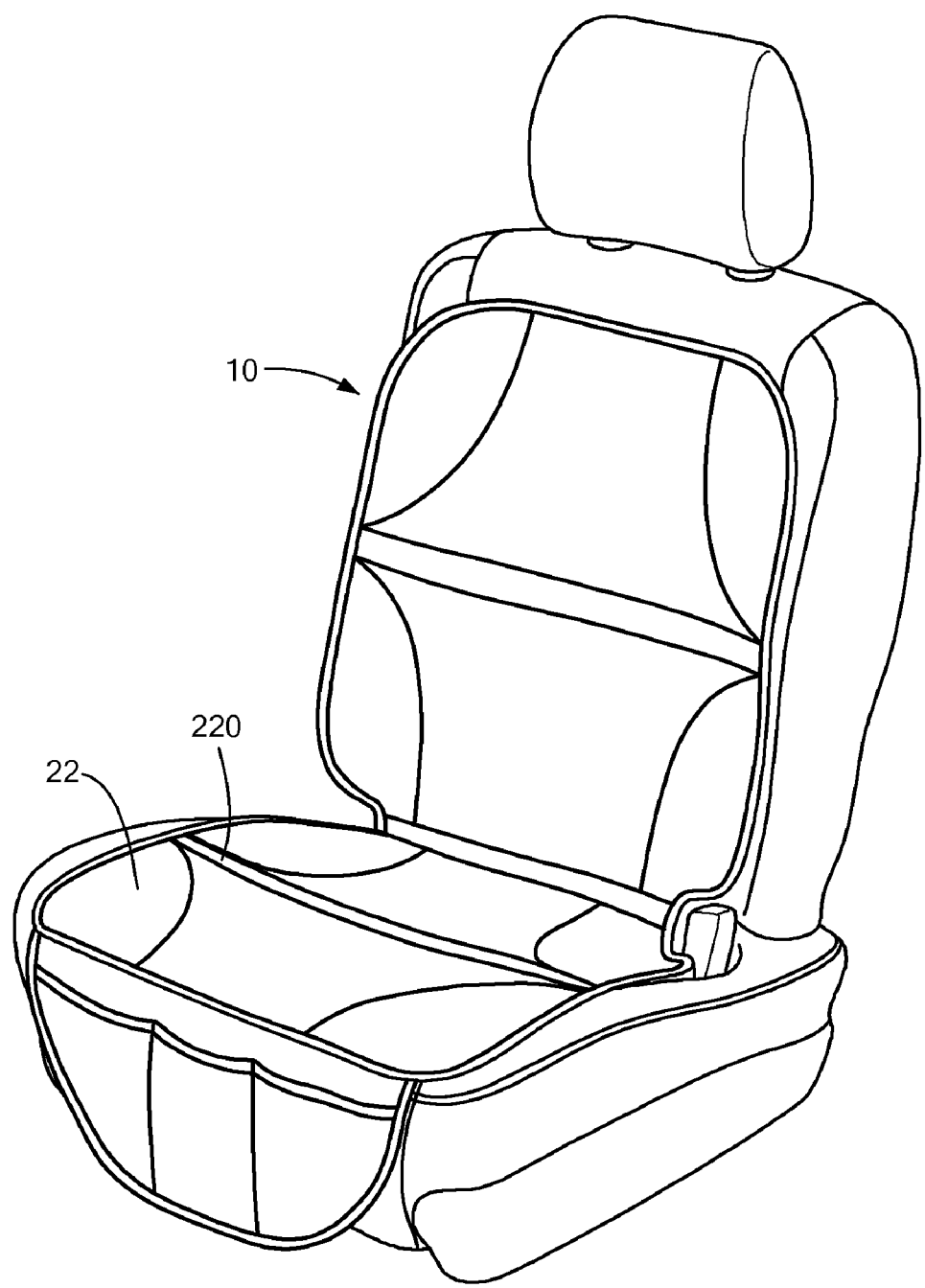
FIG. 11 is a perspective view of the seat cover used on a vehicle seat, wherein the lower protective panel includes a fold line.

The lower protective panel 22 has opposed faces and is designed to contact the seating portion 103 of a vehicle seat 100 and to accommodate the bottom of a child safety seat 102 preventing permanent compression damage and accidental soiling. In one embodiment, the lower protective panel 22 may be a single piece that does not include fold lines and can be configured to be rolled up to aid in the storage and packaging of the seat cover 10, as demonstrated in FIG. 10. In an additional embodiment, the lower protective panel may include a fold line 220 that is configured to lengthen or extend the size of the lower protective panel 22, which will aid in storage and packaging of the seat cover 10 as demonstrated in FIG. 11. In another embodiment, the fold line 220 may be positioned in any placement between the lower edge 36 and the fold line 14. In an additional embodiment the lower protective panel 22 can be configured with a multiplicity of fold lines, for example 18*b* and 20 in FIG. 1, to aid in the storage and packaging of the seat cover 10. The multiplicity of fold lines can be configured in a horizontal or vertical orientation or both to the bottom edge of the lower protective panel 22. In another alternative, the lower protective panel 22 includes at least one non-slip material member 53*a-d* on the front face 23.

Figure 2:
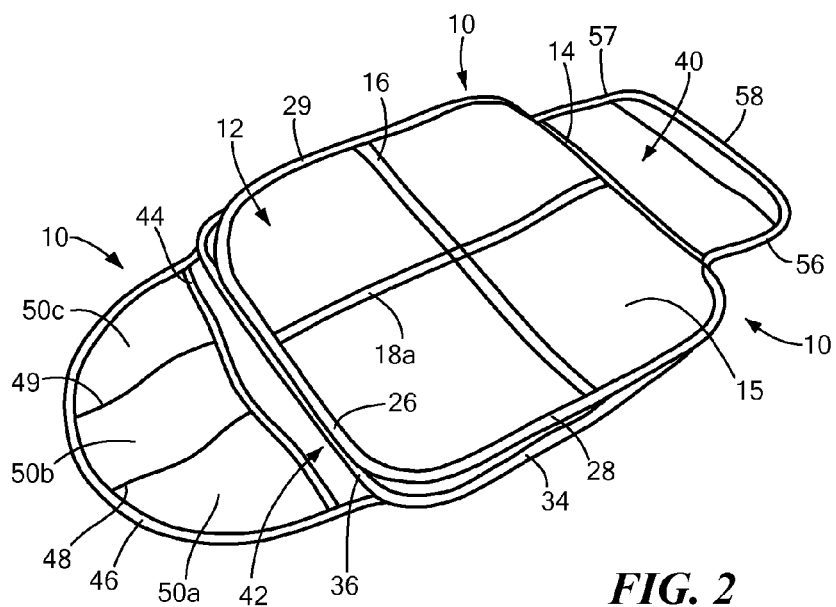
FIG. 2 is a perspective view of the seat cover of FIG. 1 illustrating the adjustable upper protective panel folded onto the face of the lower protective panel revealing the optional tongue extending rearwardly from a fold line, which integrally attaches the adjustable upper protective panel and the lower protective panel. This view also illustrates the back side of the adjustable upper protective panel.
Figure 7:
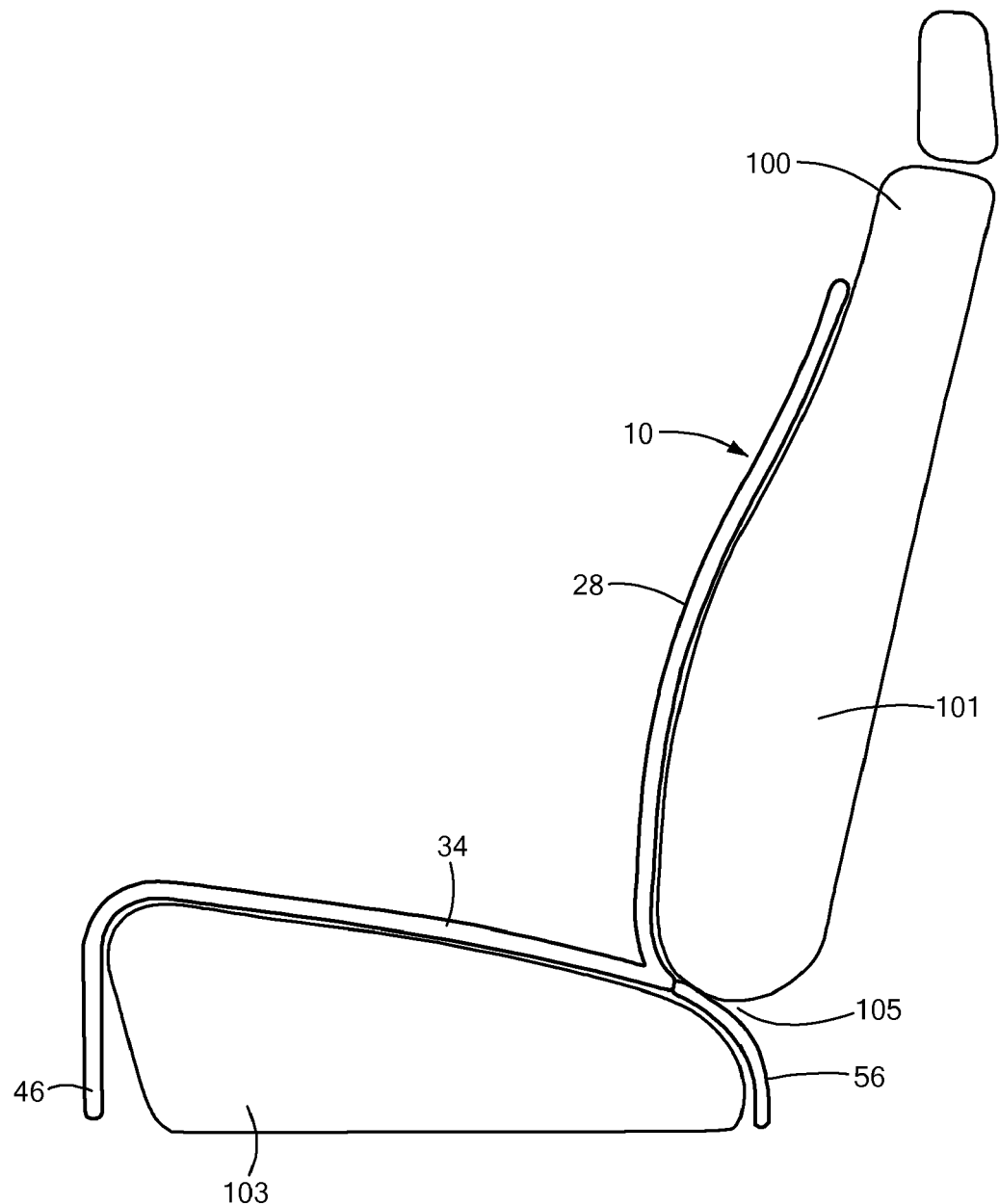
FIG. 7 is a side perspective view of the seat cover of FIG. 1 illustrating its placement on a vehicle seat to accommodate a forward-facing child safety seat thereupon and illustrating the placement of the optional tongue in a crease between the seat back portion and seat bottom portion of a vehicle seat.

In an additional embodiment, the seat cover 10 may include an integrally attached tongue 40, as shown in FIG. 2, which extends rearwardly from a fold line 14 connecting the adjustable upper protective panel 12 and lower protective panel 22. The tongue 40 is received by a crease 105 between the seating portion 103 and the seat-back portion 101 of the vehicle seat 100, as shown in FIG. 7. The tongue 40, is configured to secure the seat cover 10 in place and prevent movement while in use.

In an additional embodiment, the seat cover 10 may optionally include a storage panel 42 integral to the seat cover 10 having pockets 50*a-c*. Such pockets may be of any type that can adequately hold various items (e.g., baby bottles, toys, etc.) therein such as a mesh pocket, for example. Further, the storage panel 42 or pockets can be configured for placement anywhere on the seat cover 10 that does not hinder its use as a seat cover.

Although the Figures specifically show the lower protective panel 22, adjustable upper protective panel 12, and optional tongue 40 as being generally rectangular, it will be recognized by one of skill in the art that any shapes, configurations, sizes, and/or geometries are contemplated herein, so long as the shape can substantially accommodate the child safety seat, adjust to different configurations to accommodate both rear facing and forward facing child safety seats, allow the child safety seat to be secured to the vehicle seat, and protect the vehicle seat from becoming soiled, scratched, or permanently compressed irrespective of the direction the child safety seat is positioned. Additionally, the lower protective panel 22, adjustable upper protective panel 12 and optional tongue 40 may provide a variety of textures. However, it is preferred that the lower protective panel 22, adjustable upper protective panel 12, and optional tongue 40 are fabricated from semi-rigid material that provides at least some degree of cushioning, for example, a polymer, foamed polymer, or foam rubber, although other foamed polymer and/or materials are contemplated herein.

The seat cover or parts of the seat cover, such as the adjustable upper protective panel 12, lower protective panel 22, and tongue 40, in one embodiment, are covered or may be encapsulated with a protective cover that is configured to be easily cleaned, such as wiped clean with a wash cloth or other cleaning utensil, for example fabric, nylon, vinyl, plastic, rubber, leather or combinations therefore. Additionally, the protective cover may be fabricated from a material that possesses tactile frictional grip properties.

More particularly, in one embodiment, the present invention relates to a seat cover 10 having an adjustable upper protective panel 12, as shown in FIG. 1, having opposed faces, a front face 13 that receives the back of a child safety seat 102 and a back face 15, as shown in FIG. 2, that is received by the vehicle seat back 101 as shown in FIGS. 3-6. The adjustable upper protective panel 12 includes an upper edge 26, and opposed side edges 28 and 29 perpendicular to the upper edge 26. A fold line 14 is located opposite the upper edge 26 and is where the adjustable upper protective panel 12 integrally attaches to the lower protective panel 22. In another embodiment, the adjustable upper protective panel includes a multiplicity of fold lines 16 and 18*a*, as shown in FIG. 1, wherein fold line 16 is located intermediate to the upper edge 26 and fold line 14, and is configured to adjust the length of the upper protective panel 12. An additional optional fold line 18*a* extends longitudinally from the upper edge 26 to the fold line 14, and is configured for storage and packaging purposes. In another embodiment, the panel has at least one non-slip material member 52*a-d* on the front face 13 as shown in FIG. 1.

The lower protective panel 22, in one embodiment, as shown in FIG. 1, has opposed faces; the front face 23 receives the bottom of a child safety seat 102. The lower protective panel 22 includes a lower edge 36, and opposed side edges 34 and 35 perpendicular to the lower edge 36. The fold line 14 is located opposite the lower edge 36 and is where the lower protective panel 22 integrally attaches to the adjustable upper protective panel 12. In one another embodiment, as shown in FIG. 1, the lower protective panel includes a multiplicity of fold lines 18*b* and 20, wherein fold line 20 is located intermediate to the lower edge 36 and the fold line 14, and the fold line 18*b* extends longitudinally from the fold line 14 to the lower edge 36, the fold lines are configured to aid in storage and packaging. In another alternative, the lower protective panel 22 has at least one non-slip material member 53*a-d* on the front face 23 as shown in FIG. 1.

The seat cover 10 may optionally include an integrally attached tongue 40, as shown in FIG. 2, which extends rearwardly from the fold line 14 connecting the adjustable upper protective panel 12 and lower protective panel 22. The tongue 40 has opposed faces, a bottom edge 58, and opposed side edges 56 and 57 perpendicular to the bottom edge 58. The bottom edge 58 is located opposite the fold line 14. The fold line 14 is where the optional tongue 40 integrally attaches to the adjustable upper protective panel 12 and lower protective panel 22.

The seat cover 10 may further optionally include a storage panel 42, as shown in FIGS. 1-6, integral or removeably attached to the cover 10. In another embodiment, the seat cover 10 may further include multiple storage panels. The storage panel 42 includes an upper edge 44 opposite an arched edge 46, and is located approximate to the lower edge 36 of the lower protective panel 22. The storage panel 42 may additionally include a plurality of stitch lines, such as 48 and 49, forming a plurality of pockets, such as 50a-c, as shown in FIGS. 1-6. The pockets being designed to receive various items such as baby bottles and toys.

In an additional embodiment, the seat cover 10 may still further optionally include cutouts, such as 24 and 25 as shown in FIGS. 1 and 3-4, to receive seat appendages, such as vehicle safety belts. If present, the cutouts, for example 24 and 25, may optionally include opposed "U" shaped edges, for example 38 and 39, as shown in FIGS. 1 and 3-4, to accommodate seat appendages.

Thus, there has been shown and described an adjustable seat cover that fulfills all objects and advantages sought therefore. The invention illustratively disclosed herein suitably may be practiced in the absence of any element that is not specifically disclosed herein. It is apparent to those skilled in the art, however, that many changes, variations, modification, other uses, and applications to the seat cover are possible, and also such changes, variations, modifications, other uses, and application which do not depart from the sprit and scope of the invention are deemed to be covered by the invention, which is limited only by the claims which follow.

What is claimed is:

1. A one-piece seat cover comprising:
   a. an adjustable upper protective panel, the adjustable upper protective panel having opposed faces, an upper edge, and opposed side edges perpendicular to the upper edge;
   b. a lower protective panel having opposed faces, a lower edge, and flexible, resilient opposed side edges perpendicular to the lower edge; and
   c. an intermediate fabric fold line opposite the upper edge of the adjustable upper protective panel and the lower edge of the lower protective panel, which integrally attaches the adjustable upper protective panel and the lower protective panel;
wherein the adjustable upper protective panel further includes an upper fold line that integrally attaches upper and lower portions of the adjustable upper protective panel such that the upper portion of the adjustable upper protective panel can be selectively positioned to be one of substantially co-planar with the lower portion of the adjustable upper protective panel and substantially folded over onto the lower portion of the adjustable upper protective panel;
further comprising a tongue which emends rearwardly from the intermediate fold line, having opposed faces, a bottom edge, opposed side edge perpendicular to the bottom edge, and a tongue fold line opposite the bottom edge which integrally attaches the tongue to the intermediate fold line.

2. The seat cover of claim 1, comprising a storage panel integral to the cover, the storage panel having an upper edge at which the storage panel is in communication with the lower edge of the lower protective panel.

3. The seat cover of claim 1, wherein the adjustable upper protective panel upper portion is configured in communication with the lower portion such that the upper portion is adapted to slide away from and toward the lower portion.

4. The seat cover of claim 1, comprising cutouts for receiving seat appendages, wherein the cut-outs are disposed at opposite sides of the seat cover at the intermediate fold line, wherein the seat appendages include seat belts.

5. The seat cover of claim 1, wherein the adjustable upper protective panel and the lower protective panel are fabricated from a material configured to provide cushioning.

6. The seat cover of claim 5, wherein the adjustable upper protective panel and the lower protective panel comprise a protective cover fabricated from a material selected from the group consisting of fabric, nylon, vinyl, plastic, rubber, and leather which encapsulates the cushioning material.

7. The seat cover of claim 6, wherein the protective cover includes a non-slip material member in communication with the protective cover.

8. An adjustable one-piece seat cover comprising an adjustable upper protective panel, a lower protective panel having flexible, resilient opposed side edges, a first fabric fold line intermediate the adjustable upper protective panel and the lower protective panel which integrally attaches the adjustable upper protective panel and lower protective panel, and a second fabric fold line intermediate the adjustable upper protective panel and the first fold line such that an upper portion of the adjustable upper protective panel can be selectively positioned to be one of substantially co-planar with a lower portion of the adjustable upper protective panel and substantially folded over onto the lower portion of the adjustable upper protective panel;
further comprising a tongue integral to the adjustable seat cover and extending rearward from the first fold fine;
wherein the tongue has opposed facts, a bottom edge, opposed side edges perpendicular to the bottom edge, and a tongue fold line opposite the bottom edge which integrally attaches the tongue to first fold line of the adjustable seat cover.

9. The adjustable seat cover of claim 8, comprising a storage panel in communication with the adjustable seat cover.

10. The adjustable seat cover of claim 8, wherein the upper protective panel and lower protective panel include a multiplicity of fold lines.

11. The adjustable seat cover of claim 8, further comprising cutouts for receiving seat appendages, wherein the cut-outs are disposed at opposite sides of the adjustable seat cover at the first fold line, wherein the seat appendages include seat belts.

12. The adjustable seat cover of claim 8, wherein the adjustable seat cover is fabricated from a material configured to provide cushioning.

13. The adjustable seat cover of claim 12, wherein the adjustable seat cover comprises a protective cover which encapsulates the cushioning material.

14. The adjustable seat cover of claim 13, wherein the protective cover is fabricated from a material selected from the group consisting of fabric, nylon, vinyl, plastic, rubber, and leather.

15. The adjustable seat cover of claim 13, wherein the protective cover is fabricated from a material configured to frictionally grip a child safety seat disposed on the adjustable seat cover.

* * * * *

UNITED STATES PATENT AND TRADEMARK OFFICE
CERTIFICATE OF CORRECTION

| | |
|---|---|
| PATENT NO. | : 7,878,588 B2 |
| APPLICATION NO. | : 11/745818 |
| DATED | : February 1, 2011 |
| INVENTOR(S) | : Snedeker |

It is certified that error appears in the above-identified patent and that said Letters Patent is hereby corrected as shown below:

In Column 7, Line 56

Replace "emends"
    With "extends"

In Column 8, Line 34

Replace "fine"
    With "line"

In Column 8, Line 35

Replace "facts"
    With "faces"

Signed and Sealed this
Thirteenth Day of September, 2011

David J. Kappos
*Director of the United States Patent and Trademark Office*